United States Patent Office 3,563,708
Patented Feb. 16, 1971

3,563,708
PROCESS FOR THE ASSAY OF 3-CARBALKOXY-
4-HYDROXYQUINOLINES
Loyal R. Stone and William H. Ray, Ashland, Ohio, assignors to Richardson-Merrell Inc., New York, N.Y., a corporation of Delaware
No Drawing. Filed May 29, 1968, Ser. No. 732,882
Int. Cl. G01n 21/52, 21/02, 31/08
U.S. Cl. 23—230                              10 Claims

ABSTRACT OF THE DISCLOSURE

The use of lower aliphatic alcohols containing cations of the alkaline earth metal group in the extraction of 3-carbalkoxy-4-hydroxyquinolines from animal feeds and tissues improves the extractability thereof, increases the intensity of the fluorescence when such solutions are subjected to an activating light, and increases the spread between the wavelength of the activating light and the fluorescent response thus making it possible to greatly simplify the photofluorometric assay procedure.

---

This invention relates to an improved process for the determination of the presence of 3-carbalkoxy-4-hydroxyquinolines in animal feeds and tissues with a high degree of sensitivity and good accuracy.

In recent years a number of different 3-carbalkoxy-4-hydroxyquinolines have been proposed and used for the prevention of protozoan infections, particularly coccidiosis in chickens. A preferred method of administering the drug is in their feed, and when so used, the feed contains very small amounts of the hydroxyquinoline—sometimes as low as 0.001 percent by weight or even less in the case of the more potent drugs and when used for prophylactic treatment. Obviously, methods of quantitatively determining the amount of a 3-carbalkoxy-4-hydroxyquinoline in such animal feeds is necessary to avoid overmedication or inadequate treatment. Often the drug is mixed with elements of the animals' diet in more concentrated forms which may be subsequently mixed with part or all of the diet in the place where the birds are kept in order to avoid excessive shipping costs of the medicated feed.

It is also essential that means be provided for determining even smaller amounts of the hydroxyquinoline in the animals' tissues or in the eggs which they produce to avoid danger of offering such animal tissues to human consumers and also to comply with strict government regulations concerning drug residues in edible foodstuffs.

Various methods of detecting and quantitatively analyzing the amounts of hydroxyquinolines in animal feeds and tissues have been described in the literature. For example, a publication by Cox et al., "The Spectrophotofluormetric Determination of Buquinolate in Poultry Tissue and Eggs," was described in Poultry Science, May 1967, volume 46, No. 3, pages 680 to 686.

The method described is rather long and tedious and involves extracting of the animal feed or tissue with solvents, centrifugation, repeated chromatic development, elution, evaporation, hydrolyzation, extraction, and a final quantitative determination of the hydroxyquinoline by fluorescence. To increase the sensitivity, it was described as being necvessary to remove the alkoxy group in the 3 position by hydrolysis since this increases the sensitivity considerably, allegedly as much as ten-fold. However, the authors of the paper do concede in their discussion of the process that the procedure is rather time-consuming.

Although the process of the present invention also involves fluormetric determination of the hydroxyquinolines which are extracted from the animal feed or tissue, the process does not require the time-consuming steps of removing the ester alkoxy group to increase sensitivity since it has been found that the sensitivity can be adequately increased by using the novel extraction solvent system of the present invention. Accordingly, the process of the invention makes it possible to determine the presence of 3-carbalkoxy-4-hydroxyquinolines in feeds, animal tissue, eggs, and so forth in less time by a simpler process.

A large number of 3-carbalkoxy-4-hydroxyquinolines have been described and found to be useful in the prevention and treatment of coccidiosis in animals. For example, United States Pat. 3,267,106 issued Aug. 16, 1966, to Edward John Watson describes and claims a large number of lower alkyl esters of 6,7-di(lower)alkoxy-4-hydroxy-3-quinolinecarboxylic acid as being useful for these purposes. British Pat. 1,070,223 published on June 1, 1967, discloses a number of lower alkyl 4-hydroxyquinoline-3-carboxylates substituted at the 7 position by alkoxy, benzyloxy, and other substituents and also by having still different substituents elsewhere on the quinoline nucleus. Belgian Pats. 691,602, 691,603, and 691,604, all published on June 22, 1967, also disclose other 4-hydroxyquinoline-3-carboxylates which are useful in animal feeds in the prevention of coccidiosis. The analytical procedure of the present invention is useful in detecting the presence and amounts of all of these 3-carbalkoxy-4-hydroxyquinolines in animal feeds and tissues containing these drugs with a high degree of accuracy and sensitivity.

The process of the present invention is carried out by extracting animal feeds or tissue as will hereinafter be described in greater particularity with an alcoholic solution of an alkaline earth metal salt in which cations chosen from the group consisting of beryllium, magnesium, calcium, strontium, and barium are present. Methanol is the preferred alcohol although other alcohols such as ethanol and propanol can be used with less effectiveness. The effective range of the concentration of the salt in the alcohol is from about 0.1 percent to saturation. A 1 percent solution of calcium chloride in methanol is the most suitable metallic salt solution for the process although 1 percent solutions of strontium chloride in methanol and 1 percent solutions of magnesium sulfate in methanol are almost as good. For some reason not understood, the use of these particular solvents containing these alkaline earth metal salts enhances the fluorescence of the extracted hydroxyquinoline to an amazing extent and makes it unnecessary to hydrolyze off the ester group which may form the 3-alkoxy part of the 3-carbalkoxy substituent.

Further steps of the process include extraction of the ethanolic extract with chloroform, adsorption on a column, elution, and determination of the fluorescence of the eluted extract as will be described in more detail in the following examples.

EXAMPLE 1

For the quantitative determination of a known 3-carbalkoxy-4-hydroxyquinoline in feeds at levels of from 0 to 0.01 percent by weight, the following materials and equipment should be made available.

1 percent calcium chloride in methanol.—Dissolve 10 grams anhydrous calcium chloride, reagent grade, in 1 liter of spectroquality grade anhydrous methanol. Filter through Whatman No. 2 filter paper.

Primary standard solution.—300 μg. per milliliter. Weigh out 30 milligrams of pure 3-carbalkoxy-4-hydroxyquinoline of the kind to be determined. Dissolve and make to 100 milliliters volume with 1 percent calcium chloride-methanol solution. Prepare fresh each month.

Working standard solution.—6 μg. per milliliter. Pipet 5 milliliters of primary standard into 250 milliliters volumetric flask and make to volume with 1 percent calcium chloride-methanol.

Fluorescence reference standard.—1.5 μg. per milliliter. Pipet 25 milliliters of working standard into 100 milliliters volumetric flask and make to volume with spectroquality methanol.

Dilute hydrochloric acid.—Dilute 50 milliters of concentrated HCl to 1 liter with water.

Florisil.—100–200 mesh (Fisher F–101).

Chromatographic columns.—Make from 9 mm. tubing (7 mm. I.D.) x 300 mm. drawn to a drip tip. Insert a small plug of glass wool to support adsorbent. Close drip end with a short piece of tubing and pinchclamp and fill column with about 5 ml. chloroform. Weigh 0.5 gram Florisil, add slowly to column and allow to settle through chloroform. Use a thin glass stirring rod to break up clumps of Florisil adhering to column. Remove tubing and wash down sides of column with chloroform. Height of adsorbent should be about 3.5 cm. Prepare immediately before use.

Separatory funnels.—Either 125 ml. or 250 ml. size with Teflon stop cocks. (Glass stopcocks are not suitable because lubricant may contribute to fluorescence.)

Fluorometers.—A Farrand Model A Fluorometer may be used. This is a filter instrument requiring the following interference filters for use with this method:

Primary filter: Baird Atomic 2 x 2 interference filter second order A–2, maximum transmission at 325 mμ.
Secondary filter: Baird Atomic 2 x 2 interference filter S/UV, peak wave length 390 mμ.

The Baird Fluorispec Model SF–1 has also been used successfully and a Turner Fluorometer fitted with a No. 110–855 UV lamp has been used. Other instruments, such as the Aminco Bowman Spectrophotofluorometer, should be suitable for use with the method.

PROCEDURE (1) Weigh a 10 gram sample of feed into a 125 ml. Erlenmeyer flask.

(2) Add exactly 50 ml. of 1 percent calcium chloride in methanol solution, stopper, and shake mechanically for 20 minutes.

(3) Decant methanol solution into a centrifuge tube, spin 5 minutes at moderate speed. Pipet 10 ml. of clear methanol solution into a 125 ml. separatory funnel.

(4) Prepare standard by pipetting 10 ml. of working standard (6 μg. per ml.) into another separatory funnel.

(5) Add exactly (by pipet) 10 ml. chloroform to each funnel and mix by swirling.

(6) Add 100 ml. of dilute HCl to each funnel. Shake gently by inverting 25 times, then allow 15 minutes for phases to separate.

(7) Draw off chloroform layer into a centrifuge tube. Spin 5 minutes. Remove by aspiration any droplets of floating water phase that separate.

(8) Pipet 5 ml. of the chloroform sample solution onto a Florisil chromatographic column. Pipet 5 ml. of the chloroform standard solution on another column. Pipet 5 ml. pure chloroform solvent onto a third column (reagent blank).

(9) Pass two 10 ml. portions of anhydrous methanol through each column. Allow methanol to drain to surface of Florisil adsorbent and discard column effluent.

(10) Elute drug from columns with 15 ml. of 1 percent calcium chloride in methanol solution. Collect in tube marked at 15 ml. volume. Mix well and transfer to Fluorometer cells.

(11) Set activation wave length of fluorometer at 325 mμ and emission wave length at 390 mμ. Set fluorometer sensitivity with Fluorescence Reference Standard to give a convenient scale reading (e.g. 100).

(12) Determine fluorescence of samples, standard and reagent blank.

(13) Substract reagent blank correction, if any, from reading of standard and samples.

CALCULATION $$\frac{\text{Corrected fluor sample}}{\text{Corrected fluor standard}} \times .003 = \text{percent drug in feed}$$

The use of a lower aliphatic alcohol having a bivalent metal salt dissolved therein as described above allows complete extraction of the drug from feed with 20 minutes of shaking and with the extraction of less interfering materials from the feed than in the case of solvents previously used in similar determinations.

A sample of the unmedicated feed is not required for quantitatively determining the amount of 3-carbalkoxy-4-hydroxyquinolines in animal feeds since the amount of apparent drug in control feeds when assayed in accordance with the process of the present invention is insignificant—usually on the order of about 0.00003 percent by weight of apparent drug in the feed.

The fluorescent response with graduated amounts of drug in the feed is essentially linear and essentially the same readings are obtained with the drug added to the feed as are observed when the same amount of drug is added to a pure solvent.

Reproducibility of the procedure described above is approximately within 3 percent of the actual amount of the drug in the feed assayed.

To illustrate the increase in fluorescence of the drug solutions when measured in methanol containing 1 percent of calcium chloride, fluorometric readings were made with the drug ethyl 6-decyloxy-7-ethoxy-4-hydroxyquinoline-3-carboxylate, as its acetate, and in its acid form when dissolved in methanol at one part per million as shown in the following table.

TABLE I

| Drug: | Fluorometer scale reading |
| --- | --- |
| 1 p.p.m. in methanol | 11 |
| Acid derivative, 1 p.p.m. in methanol | 31 |
| Acetate derivative, 1 p.p.m. in methanol | 62 |
| 1 p.p.m. in methanol with 1% $CaCl_2$ | 95 |

As will be seen, the use of 1 percent calcium chloride in the methanol solvent increased the fluorometric reading by about 8½ times. This illustrates why it is unnecessary to remove the ethyl ester forming radical from the 3-carboxylate moiety by an involved and time-consuming procedure.

It is also pointed out that while the acetate derivative gave a fluorometric reading of about 5½ times that of the ethyl ester in pure methanol, the spread between the maximum effective activation and emission wave lengths of the acetate in methanol was only 26 μm. whereas in the case of the ethyl ester dissolved in methanol containing 1 percent calcium chloride, the spread was 60 μm. As will be apparent, the greater separation between the activating and emitted wave lengths is another advantage which results from the use of the alkaline earth metal salt in lower aliphatic alcohols as solvent for the drug.

The unexpected increase in fluorescence due to the addition of calcium chloride to the methanolic solutions of various 3-carbalkoxy - 4 - hydroxyquinolines is illustrated in the following table.

TABLE II

| Compound | Fluor methanol only | Fluor methanol with 1% $CaCl_2$ | Enhancement |
| --- | --- | --- | --- |
| Ethyl 6-decyloxy-7-ethoxy-4-hydroxyquinoline-3-carboxylate | 11 | 95 | X8½ |
| Ethyl 6,7-diisobutoxy-4-hydroxyquinoline-3-carboxylate | 13 | 103 | X8 |
| Methyl 6-n-butyl-7-benzyloxy-4-hydroxyquinoline-3-carboxylate | 11 | 88 | X8 |
| Ethyl 6-methyl-7-methoxy-4-hydroxyquinoline-3-carboxylate | 9 | 107 | X12 |

EXAMPLE 2

The materials, equipment, and process for assaying the 3 - carbalkoxy - 4 - hydroxyquinolines in animal tissue, usually chicken flesh, is substantially the same as described above in connection with the assay of chicken feed. However, there are some differences which will be noted in this example.

PROCEDURE (1) Weigh 25 to 50 grams tissue sample. Place in blender.

(2) Weigh quantity of methanol equal to exactly four times sample weight and add to blender.

(3) Homogenize at high speed for one minute.

(4) Transfer homogenate to centrifuge bottle and spin at 2000 r.p.m. for ten minutes.

(5) Decant the clear methanol extract and weigh 50 grams of the solution (equivalent to 10 grams of tissue sample) into each of two 250 ml. separatory funnels.

(6) Using a lambda pipette, transfer 10 $\mu$l. of primary standard (contains 1 $\mu$g. of the drug) into one of the funnels. This is equivalent to 0.1 p.p.m. of the drug in a 10 gram tissue sample.

(7) Weigh 50 grams methanol into a third separatory funnel for use as a reagent blank.

(8) Add 100 ml. of 5 percent metaphosphoric acid solution to each funnel and mix well by shaking.

(9) Add 10 ml. of chloroform to each funnel, shake 50 times and allow 15 minutes for phases to separate.

(10) Draw off chloroform layer into a test tube. Add 5 ml. additional chloroform to each funnel. Shake, separate and combine the chloroform extracts for each sample.

(11) Prepare Florisil chromatographic columns, one for each sample. Apply entire chloroform extract from each sample to a Florisil column. Rinse container with 5 ml. chloroform and add to column.

(12) Pass 10 ml. of methanol through the column. Allow to drain to top of adsorbent packing, discard column effluent.

(13) Place receiving test tube graduated at 10 ml. under column. Pipet 10 ml. of elution solvent into column and collect the eluate to the 10 ml. mark. Mix well and transfer to fluorometer cells.

(14) Set activation wave length of fluorometer at 325 m$\mu$ and emission wave length at 390 m$\mu$. Set fluorometer sensitivity with Fluorescence Reference Standard to give a convenient scale reading (50 to 100).

(15) Determine fluorescence of samples, spiked samples, and reagent blank solutions under the same conditions.

CALCULATION $$\frac{\text{Fluor sample-fluor reagent blank}}{\text{Fluor spiked sample-fluor sample}} \times 0.1$$

= p.p.m. of drug in sample

Fluorometric readings with control tissue samples were found to be the same or only slightly higher than the reagent blanks. Interference from natural chicken materials therefore is almost negligible. The fluoroescent response from a drug standard varies somewhat with the kind of tissue which is added. The response is greater when examining control tissue extracts to which a standard has been added than in the case of where the standard solution has been added to methanol. No explanation is apparent at the present time for these differences but the determination must be based on the standard solution added to the tissue sample rather than on the standard added to methanol.

It is suggested that when assaying tissues containing more than 0.1 part per million of drug, graduated amounts of the drug to be quantitatively determined be added to control tissues free of the drug in amounts equivalent to 0.1 part per million, 0.5 part per million, and 1.0 part per million and the resulting fluorometric readings from the extracted tissue be plotted to obtain a linear curve which may be used in determining the amount of drug in the unknown sample.

What is claimed is:

1. A process for the quantitative determination of 3-carbalkoxy-4-hydroxyquinolines in solutions containing the same which comprises adsorbing the said 3-carbalkoxy-4-hydroxyquinoline on an adsorbent by passing the said solution through a chromatographic column, eluting the 3-carbalkoxy-4-hydroxyquinoline from the adsorbent in said chromatographic column with a lower aliphatic alcohol containing 0.1 percent by weight to saturation of a salt of an alkaline earth metal and measuring the fluorescence of said alcoholic eluate to determine the amount of said 3 - carbalkoxy-4-hydroxyquinoline contained therein.

2. A process in accordance with claim 1 in which the alcohol is methanol.

3. A process in accordance with claim 1 in which the alkaline earth metal salt is calcium chloride.

4. A process in accordance with claim 1 in which the activating light is 325 $\mu$m and the fluorescent response of the alcoholic solution containing the 3-carbalkoxy-4-hydroxyquinoline is measured at 390 $\mu$m.

5. A process in accordance with claim 1 in which the 3-carbalkoxy-4-hydroxyquinoline is ethyl 6 - decyloxy-7-ethoxy-4-hydroxyquinoline-3-carboxylate.

6. A process for the quantitative determination of the amount of a 3-carbalkoxy-4-hydroxyquinoline in animal feed which comprises extracting the 3-carbalkoxy-4-hydroxyquinoline from said animal feed with a lower aliphatic alcohol containing cations of the alkaline earth metal group, extracting said 3-carbalkoxy - 4 - hydroxyquinoline from the aliphatic alcohol with chloroform, passing an aliquot of said chloroform extract through a chromatographic column, washing said column with an organic solvent, eluting the 3-carbalkoxy-4-hydroxyquinoline from said chromatographic column with a lower aliphatic alcohol containing cations of the alkaline earth metal group and measuring the fluorescence of said alcoholic eluate to determine the amount of said 3-carbalkoxy-4-hydroxyquinoline contained therein.

7. A process in accordance with claim 6 in which the alcoholic solvent is methanol containing calcium chloride.

8. A method in accordance with claim 6 in which the absorbent chromatographic column is Florisil.

9. A method in accordance with claim 6 in which the 3 - carbalkoxy-4-hydroxyquinoline is ethyl 6-decyloxy-7-ethoxy-4-hydroxyquinoline-3-carboxylate.

10. A method in accordance with claim 6 in which the 3-carbalkoxy-4-hydroxyquinoline in animal tissue is extracted.

References Cited

Cox et al., Poultry Science, vol. 46, pp. 680–6 (1967).

Kimura, K., et al., Journal of Physical Chemistry, vol. 71, pp. 2744–7 (1967).

MORRIS O. WOLK, Primary Examiner

E. A. KATZ, Assistant Examiner

U.S. Cl. X.R.

252—408; 424—7; 250—71